(No Model.)

O. P. SNYDER.
HOSE COUPLING.

No. 475,254. Patented May 17, 1892.

WITNESSES
Franklin Messinger
Cyrus Fehnel

INVENTOR
Oswell Peter Snyder
By G. T. Oplinger,
His Attorney.

UNITED STATES PATENT OFFICE.

OSWILL PETER SNYDER, OF BANGOR, PENNSYLVANIA, ASSIGNOR OF TWO-THIRDS TO OLIVER W. HOUCK AND FRANKLIN RASNER, OF SAME PLACE.

HOSE-COUPLING.

SPECIFICATION forming part of Letters Patent No. 475,254, dated May 17, 1892.

Application filed February 23, 1892. Serial No. 422,537. (No model.)

*To all whom it may concern:*

Be it known that I, OSWILL PETER SNYDER, a citizen of the United States, residing at Bangor, in the county of Northampton and State of Pennsylvania, have invented a new and useful Hose-Coupling, of which the following is a specification.

The object of my invention is to provide a simple device for uniting or disuniting sections of hose or flexible tubing; and it consists in the combination, with a sleeve having an internally-tapered end or ends, largest in diameter at the outer extremity, and an interior screw-threaded portion, of a tube having an enlarged head at one end and its other end exteriorly threaded to engage the threads of the sleeve and adapted to be screwed into the latter and in so doing to clamp the end of the hose between the enlarged head of tube and the conical mouth of the sleeve, the end of sleeve projecting sufficiently beyond the headed end of the tube to prevent any lateral strain on the latter by external pressure, as will be clearly understood from the following description and claims.

Figure 1:
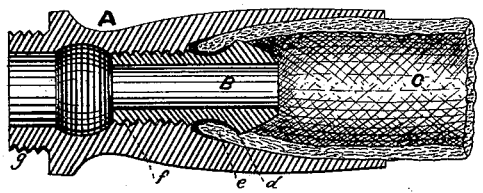
Figure 2:
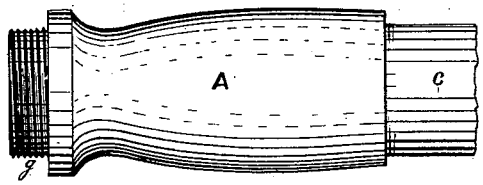
Figure 3:
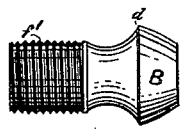
Figure 4:
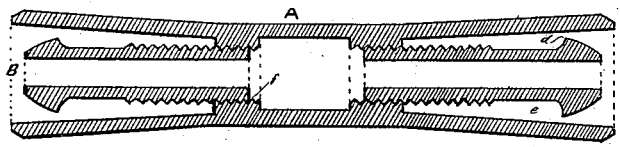
Figure 5:
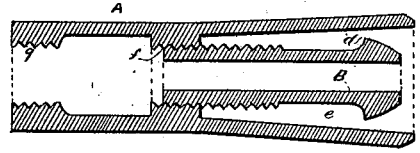

Reference being had to the accompanying drawings by letters of reference marked thereon, forming part of this specification, Figure 1 is a longitudinal vertical section through one of the hose couplings or joints. Fig. 2 is a side view of the sleeve; Fig. 3, a similar view of the tube. Fig. 4 is a longitudinal sectional view of a coupling for uniting the ends of two sections of tubing. Fig. 5 is a view of the form of the coupling for connecting a hose to a hydrant.

A designates a sleeve having a reduced threaded end $g$, which is adapted to be screwed into the end of an iron pipe or connected to a threaded opening in any water-supply. Its opposite end is slightly expanded, so that its interior is conical, the largest diameter thereof being outermost, and at its center the bore is constricted and is screw-threaded, as at $f$.

D designates a tube smaller and shorter than the sleeve, having one screw-threaded end $f'$ and its opposite end enlarged into a head which is angular in cross-section, having a sharp apex, as at $d$, for the purpose of "biting the tube."

In applying the joint or coupling to a hose the head $d$ of tube B is first slipped into the end of hose and then, with the end of hose, is introduced into the conical end of the sleeve, the hose being slipped therein until stopped by the constriction in the sleeve. The tube, or sleeve, is then turned while the sleeve, or tube, is held stationary, screwing the tube into the sleeve and causing head $d$ to bite the end of hose and clamp it firmly against the converging interior walls of the tube, the end of hose expanding behind the head $d$, as shown at $e$ in Fig. 1. It will be observed that the sleeve projects beyond end of tube when the parts are properly screwed up and that it forms a stiff solid non-sectional outer casing over the joint and end of hose. Thus to form the joint I use but two pieces and make one of these serve as a protector and casing for the other. Obviously by simply elongating the sleeve and conically boring both its ends and employing two tubes, as shown in Fig. 4, the device may be used as an effective coupling for uniting two sections of hose.

In Fig. 1 the hose-end-receiving portion of the bore of the sleeve is convexo-conical, while in Figs. 4 and 5 the bores are simply conical. The convexo-conical bores require less travel of the tube in making a joint.

Having described my invention, what I claim as new, and desire to secure by Letters Patent thereon, is—

1. In a coupling-joint, the combination of the sleeve having a conical bore and a screw-threaded constriction in the bore with a tube shorter than the sleeve and fitted therein, having a screw-threaded end adapted to engage the threaded constriction and an enlarged head on its other end, substantially as described.

2. The combination of the inclosing sleeve having its bore conical at one end and constricted at the inner extremity of the conical portion, said constriction being internally threaded, with a tube having one end threaded to engage the threads of the constriction and its other end formed with an enlarged head angular in cross-section, substantially as specified.

3. A pipe-joint consisting of the sleeve A, having screw-threaded constriction $f$ and a convexo-conical bore at one side of said constriction, with a tube B, having a threaded end engaging the constriction and an enlarged head on its other end angular in cross-section, said tube being entirely confined and concealed in the sleeve when connected therewith, substantially as set forth.

OSWILL PETER SNYDER.

Witnesses:
FRANKLIN MESSINGER,
CYRUS FEHNEL.